(12) United States Patent
Kemmerer et al.

(10) Patent No.: US 12,010,948 B2
(45) Date of Patent: Jun. 18, 2024

(54) HEADER WITH TRAPEZOIDAL PROFILE

(71) Applicant: CNH Industrial America LLC, New Holland, PA (US)

(72) Inventors: Benjamin David Kemmerer, Hamburg, PA (US); Blaine Robert Noll, Fleetwood, PA (US); Herbert Max Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 607 days.

(21) Appl. No.: 17/294,574

(22) PCT Filed: Oct. 28, 2019

(86) PCT No.: PCT/US2019/058298
§ 371 (c)(1),
(2) Date: May 17, 2021

(87) PCT Pub. No.: WO2020/101872
PCT Pub. Date: May 22, 2020

(65) Prior Publication Data
US 2022/0007574 A1 Jan. 13, 2022

Related U.S. Application Data

(60) Provisional application No. 62/768,175, filed on Nov. 16, 2018.

(51) Int. Cl.
*A01D 41/14* (2006.01)
*A01D 41/06* (2006.01)

(52) U.S. Cl.
CPC ............. *A01D 41/14* (2013.01); *A01D 41/06* (2013.01)

(58) Field of Classification Search
CPC ...... A01D 41/14; A01D 41/06; A01D 14/141; A01D 14/142; A01D 14/144; A01D 14/145; A01D 14/147; A01D 14/148
See application file for complete search history.

(56) References Cited

U.S. PATENT DOCUMENTS 1,138,223 A 5/1915 Jones
4,409,780 A * 10/1983 Beougher ............... A01B 73/02
56/228

(Continued)

FOREIGN PATENT DOCUMENTS

DE 102012011912 A1 12/2013
DE 102016103475 A1 8/2017
EP 2695510 A1 2/2014

OTHER PUBLICATIONS

International Search Report for PCT application PCT/US2019/058298, dated Mar. 16, 2020 (14 pages).

*Primary Examiner* — Abigail A Risic
(74) *Attorney, Agent, or Firm* — Peter K. Zacharias; Rebecca L. Henkel; Rickard K. DeMille

(57) ABSTRACT

A header of an agricultural harvester is provided. The header includes a frame having a centerline defining a first side and a second side of the frame. A first portion of either the first side or the second side of the frame has a first trapezoidal profile that includes a first pair of legs that run along a longitudinal axis of the frame and a first pair of bases that form a height of the frame. The first pair of legs include a first top leg and a first bottom leg, and the first bottom leg is angled toward the longitudinal axis.

20 Claims, 4 Drawing Sheets

FIG. 4

(56) References Cited

U.S. PATENT DOCUMENTS

| | | |
|---|---|---|
| 9,675,007 B2 | 6/2017 | Schrattenecker |
| 10,433,483 B2 * | 10/2019 | Cook .................... A01D 41/144 |
| 2014/0325948 A1 | 11/2014 | Schrattenecker |
| 2015/0156969 A1 | 6/2015 | Mossman |
| 2020/0359562 A1 * | 11/2020 | Hunt ..................... A01D 41/141 |
| 2022/0071090 A1 * | 3/2022 | Kemmerer ........... A01D 41/144 |
| 2022/0095538 A1 * | 3/2022 | Welle .................... A01D 41/06 |

* cited by examiner

HEADER WITH TRAPEZOIDAL PROFILE

BACKGROUND

The disclosure relates generally to a header for use with combine harvesters. In particular, a portion of a header frame includes a trapezoidal profile.

An agricultural combine is a machine used to harvest a variety of crops from a field. Typically, the agricultural combine is coupled to a header that cuts the crop. The headers typically have a shape (e.g., rectangular) that is large and heavy. In the shape of the header limits the visibility of the operator during harvesting. Further, the shape of the header may minimize ground clearance resulting in a bottom side of the header to knock over crop when the combine turns. Therefore, there is a need for a header that is less cumbersome.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a header of an agricultural harvester is provided. The header includes a frame having a centerline defining a first side and a second side of the frame. A first portion of either the first side or the second side of the frame has a first trapezoidal profile that includes a first pair of legs that run along a longitudinal axis of the frame and a first pair of bases that form a height of the frame. The first pair of legs include a first top leg and a first bottom leg, and the first bottom leg is angled toward the longitudinal axis.

In another embodiment, a header of an agricultural harvester is provided. The header includes a frame having a centerline defining a first side and a second side of the frame. A first portion of the first side of the frame has a first trapezoidal profile including a first pair of legs that run along a longitudinal axis of the frame and a first pair of bases that form a height of the frame. The first pair of legs include a first top leg and a first bottom leg, and the first bottom leg is angled toward the longitudinal axis. A second portion of the second side of the frame has a second trapezoidal profile including a second pair of legs that run along a longitudinal axis of the frame and a second pair of bases that form the height of the frame. The second pair of legs include a second top leg and a second bottom leg, and the second bottom leg is angled toward the longitudinal axis.

In a further embodiment, an agricultural harvester is provided. The agricultural harvester includes a header. The header includes a frame having a centerline defining a first side and a second side of the frame, wherein a first portion of either the first side or the second side of the frame has a first trapezoidal profile including a first pair of legs that run along a longitudinal axis of the frame and a first pair of bases that form a height of the frame. The first pair of legs include a first top leg and a first bottom leg, and the first bottom leg is angled toward the longitudinal axis.

DRAWINGS

These and other features, aspects, and advantages of the present invention will become better understood when the following detailed description is read with reference to the accompanying drawings in which like characters represent like parts throughout the drawings, wherein.

Figure 4:
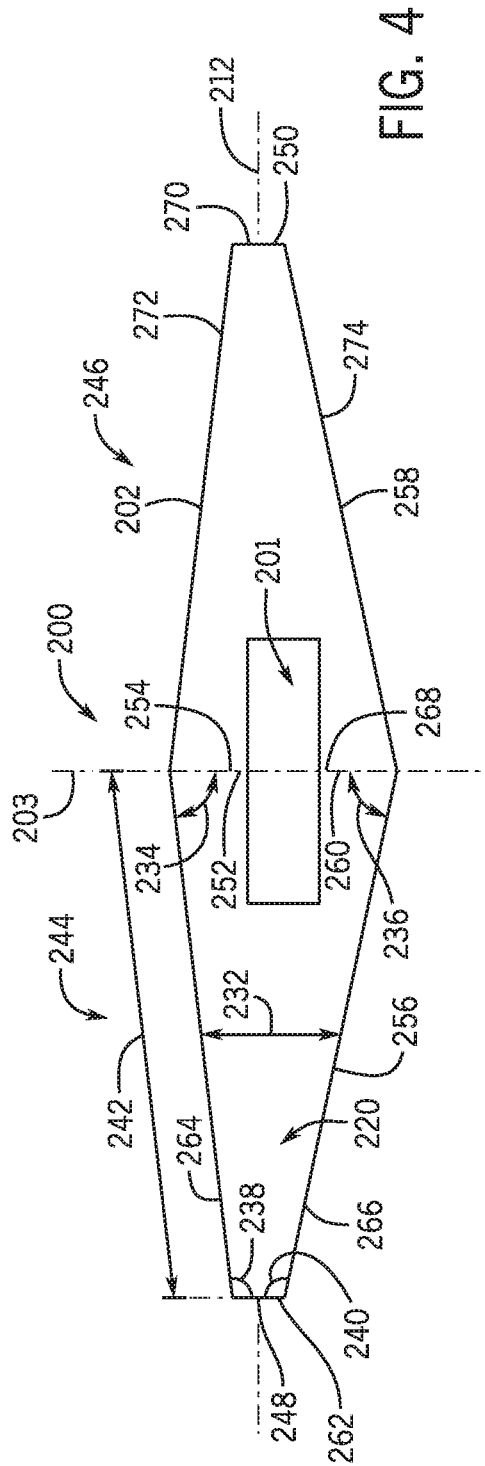
Figure 5:
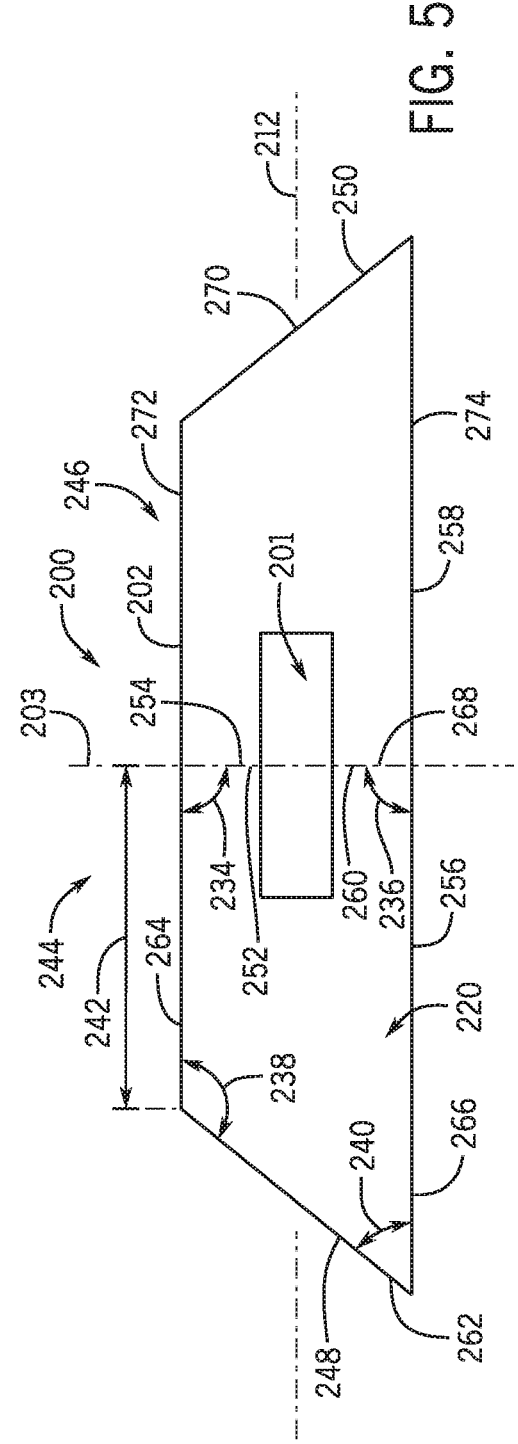

FIG. 4. is a front view of an embodiment of an outline of a frame having a portion with a trapezoidal profile (e.g., extending from centerline); and FIG. 5 is a front view of an embodiment of an outline of a frame having a portion with a trapezoidal profile (e.g., having a right trapezoid profile).

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Certain embodiments of the present disclosure include a header (e.g., draper header) for a harvester. The header may include a frame having a portion that includes a trapezoidal profile. In certain embodiments, the frame includes a centerline defining a first side and a second side of the frame, wherein a portion of the first side, the second side, and both the first and second sides of the frame include a trapezoidal profile. The trapezoidal profile includes a pair of legs that run along a longitudinal axis of the frame and a pair of bases that form a height of the frame. The pair of legs include a top leg and a bottom leg, and the bottom leg is angled toward the longitudinal axis. In certain embodiments, both the top leg and the bottom leg are angled toward the longitudinal axis. The narrowing of the trapezoidal profile from a center portion of the frame to an outer portion of the frame increases the visibility for the operator of the combine (particularly of the function components of the header). In addition, the taper on the bottom portion of the frame increases the ground clearance of the header relative to the ground which helps keep the header from knocking over crop during turns. In addition, reducing the cross-sectional area of the frame (e.g., due to the trapezoidal profiles) from adjacent the center toward the outer ends reduces the amount of structure and, thus, the weight of the frame. Further, the back sheets of the frame do not need to be as high near the ends of the frame since the crop only accumulates at it approaches the center of the header.

Figure 1:
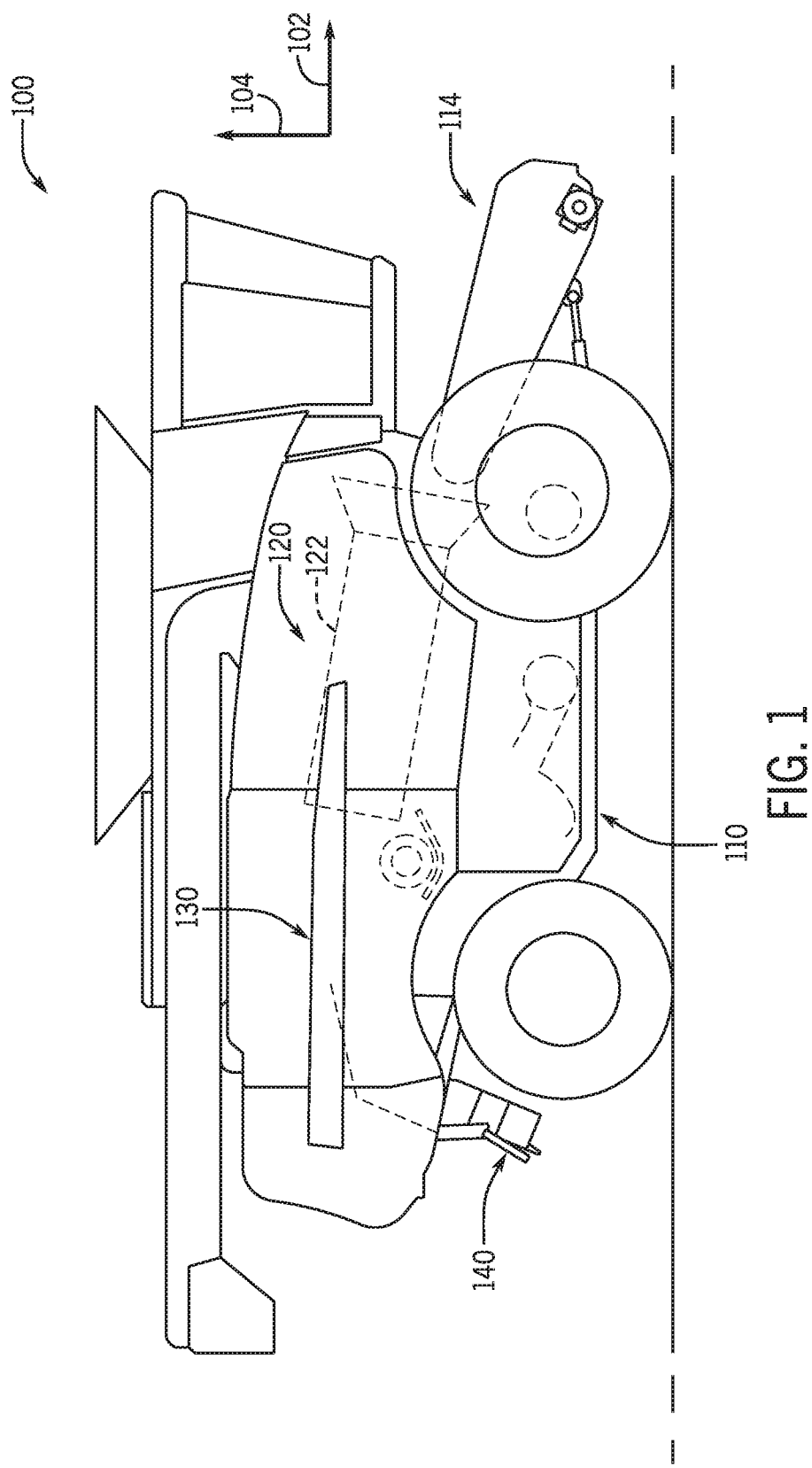
FIG. 1 is a side view of an embodiment of a harvester having a header, in accordance with an aspect of the present disclosure.

With the foregoing in mind, the present embodiments relating to a header may be utilized within any suitable harvesting system. For example, FIG. 1 is a side view of an embodiment of a harvester 100 (e.g., agricultural harvester or combine harvester). To facilitate discussion, the harvester 100 and certain components of the harvester 100 may be described with reference to a longitudinal axis or direction 102 and a vertical axis or direction 104. The harvester 100 includes a header (e.g., draper header, not shown) that cuts crops and directs movement of the cut crops towards an inlet of a feederhouse 114 of the harvester 100 for further processing of the cut crops. The harvester 100 includes a longitudinally oriented crop processing system 120 that receives cut crops from the feederhouse 114. As an example, the crop processing system 120 includes a thresher 122 that conveys a flow of crops from the feederhouse 114 into the crop processing system 120. In some embodiments, the thresher 122 is a cylindrical threshing rotor that transports the crops in a helical flow path. In addition to transporting the crops, the thresher 122 may also separate certain desired crop material (e.g., grain) from the crops by loosening and separating the crop material from crop residue, such as husk and pods, into a cleaning system located beneath the thresher 122. The remaining crop residue may be transported from the thresher 122 to a crop residue handling system 130, which may hold the crop residue for further processing and/or remove the crop residue from the harvester 100 via a crop residue spreading system 140 positioned at the aft end of the harvester 100.

Figure 2:
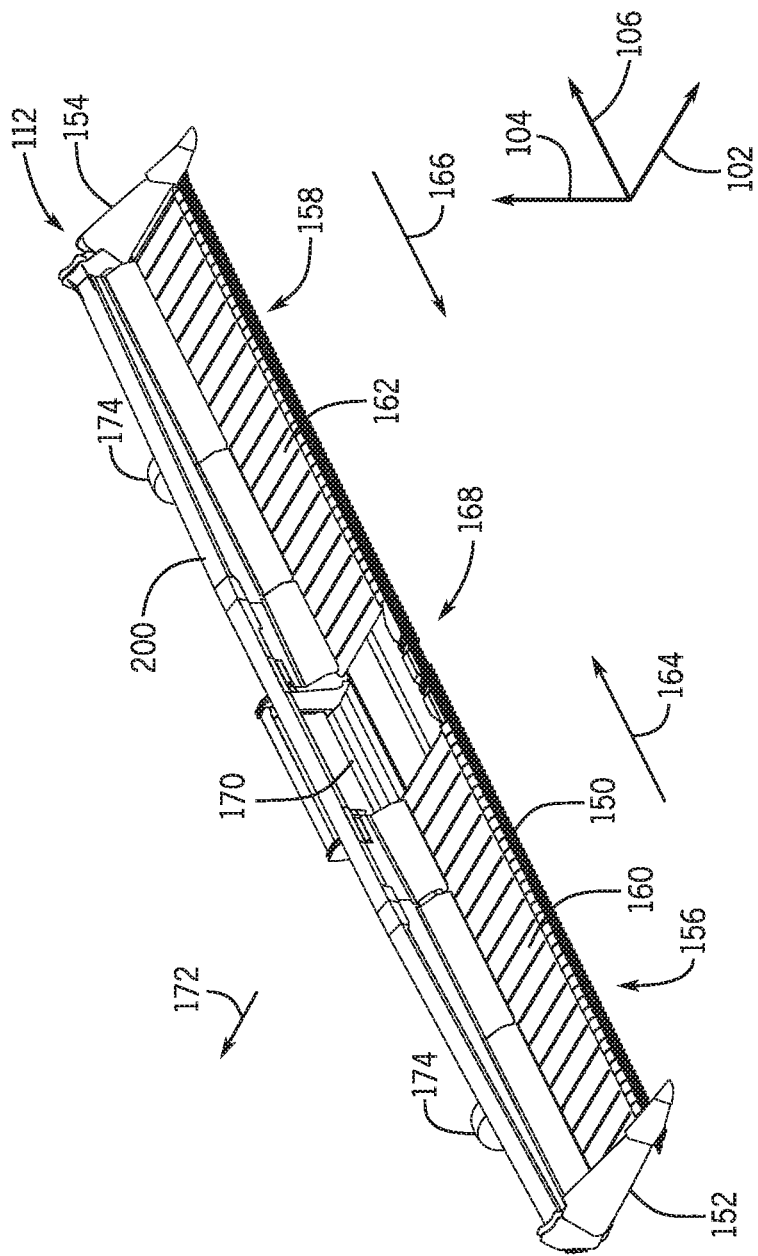
FIG. 2 is a top perspective view of an embodiment of a header that may be coupled to a feederhouse of the harvester of FIG. 1, in accordance with an aspect of the present disclosure.

FIG. 2 is a top perspective view of an embodiment of a header 112 (e.g., draper header) that may be coupled to the feederhouse of the harvester. To facilitate discussion, the header 112 and certain components of the header 112 may be described with reference to a lateral axis or direction 106. It should be noted that not all components of the header 112 are shown (e.g., reel, infeed auger, etc.). The header 112 includes a frame 200 that may be removably coupled to the feederhouse. The header 112 also includes a cutter bar 150 that extends along the lateral axis 106 between a first header end 152 and a second header end 154 of the frame 200. When the harvester 100 is in operation, blades of the cutter bar 150 may come into contact with and cut a portion of crops. The portion of the crops that are cut may be dropped onto a first side draper deck 156 and a second side draper deck 158. The first side draper deck 156 includes a first side conveyor 160, and the second side draper deck 158 includes a second side conveyor 162. The first side draper deck 156 extends along the lateral axis 106 and moves crops generally in a direction 164. The second side draper deck 158 extends along the lateral axis 106 and moves crops generally in a direction 166.

An infeed draper deck 168 is disposed generally along a center of the header 112 and between the first side draper deck 156 and the second side draper deck 158. As illustrated, the infeed draper deck 168 extends along the longitudinal axis 102. The infeed draper deck 168 includes an infeed conveyor 170. As each of the first side draper deck 156 and the second side draper deck 158 receive the portion of the crops cut by the cutter bar 150, the first side draper deck 156 and the second side draper deck 158 move the portion of the crops toward the infeed draper deck 168 in the first direction 164 and the second direction 166, respectively. The infeed draper deck 168 moves the portion of the crops in a direction 172 toward the feederhouse and the crop processing system.

As illustrated, the header 112 includes wheels 174 that enable the harvester to drive the header 112 over certain surfaces (e.g., a field, hills, roads, and other uneven surfaces). As the header 112 traverses the surfaces, the cutter bar 150 may flex. For example, the cutter bar 150 may flex to generally match a contour of the surface. The ability of the cutter bar 150 to flex enables the harvester to precisely cut the crops at a specific location of the crops and to achieve higher crop yields while harvesting.

Figure 3:
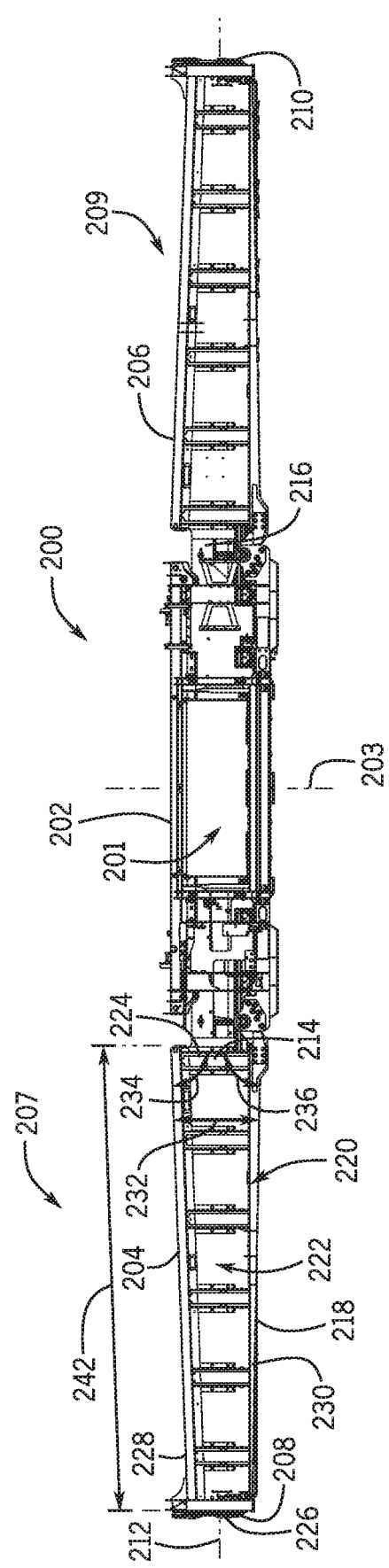
FIG. 3 is a rear view of an embodiment of a frame having a portion with a trapezoidal profile.

FIG. 3 is a rear view of an embodiment of the frame 200 having a portion with a trapezoidal profile. As depicted, the frame 200 includes separate components including a center section 202 (including the inlet 201), a first segment 204, and a second segment 206 to form a modular frame (e.g., segmented frame). The segments 204, 206 flank the center section 202 on each side (e.g., opposite sides 207, 209) of a centerline or plane 203 (e.g., bisecting frame 200 in half). In certain embodiments, the frame 200 may be flexible (e.g., the segments 204, 206 may move relative to the center section 202). In certain embodiments, the frame 200 may be formed as a single component (e.g., not segmented). In certain embodiments, the frame 200 may be form a rigid structure.

The frame 200 includes a first longitudinal end 208 and a second longitudinal end 210 relative to a longitudinal axis 212 of the fame 200. The segment 204 includes a longitudinal end 214 disposed adjacent (e.g., proximate) the center section 202 and centerline 203 and the longitudinal end 208 located distal from the center section 202 and the centerline 203. The segment 206 includes a longitudinal end 216 disposed adjacent (e.g., proximate) the center section 202 and the centerline 203 and the longitudinal end 210 located distal from the center section 202 and the centerline 203.

As depicted, both sides 207, 209 of the frame 200 include a portion 218 (outlined only on side 207) that includes a trapezoidal shape or profile. The sides 207, 209 (including center section 202) generally form mirror images of each other about the centerline 203. As depicted, the trapezoidal shape is located on a front side 220 of the frame 200 and extends towards a rear side 222 of the frame 200. In certain embodiments, the portion of the frame including the trapezoidal profile may be located on a different part of the frame 200 (e.g., top side, bottom side, etc.). In certain embodiments, only one side 207, 209 of the frame 200 may include the portion 218 having the trapezoidal profile.

The portion 218 includes bases 224, 226 and legs 228, 230. Base 224 is disposed, at end 214, adjacent (e.g., proximate) the center section 202 and the centerline 203. The base 226 is disposed, at end 208, distal from the center section 202 and the center line 203. At their respective axial locations (e.g., relative to the longitudinal axis 212), the bases 224, 226 extend traverse (e.g., orthogonal) to the longitudinal axis 212 and define a height 232 of the frame 200. As depicted, the height 232 of the frame 200 decreases from base 224 to base 226 (i.e., base 224 is longer than base 226). The legs 228, 230 run along the longitudinal axis 212 of the frame 200. As depicted, base 224 and leg 228 form an acute angle 234, while base 226 and leg 230 form an adjacent acute angle 236. Thus, as depicted, the trapezoidal profile of the portion 218 is an acute trapezoid. Base 226 and leg 228 form an obtuse angle 238 and base 226 and leg 230 form an adjacent obtuse angle 240. Due to the acute angles 234, 226, the legs 228, 230 are both angled toward the longitudinal axis 212 and the portion 218 (i.e., trapezoidal profile) tapers from base 224 toward base 226. As depicted, the legs 228, 230 have a same length 242. Thus, the trapezoidal profile of the portion 218 is also an isosceles trapezoid. In certain embodiments, the legs 228, 230 may have different lengths. In certain embodiments, the trapezoidal profile may be of a different trapezoid configuration. The description of the portion 218 applies to the mirror trapezoid profile defined on side 209 (which is orientated in the opposite direction relative to the longitudinal axis 212).

The taper on the leg 228 (i.e., top portion of the frame 200) and the decrease in height 232 of the frame 200 from adjacent the center toward the longitudinal end of the frame 200 increases the visibility for the operator of the combine 100 (particularly of the function components of the header 223). The taper on the leg 230 (i.e., bottom portion of the frame 200) increase the ground clearance of the header 112 relative to the ground which helps keep the header 112 from knocking over crop during turns. In addition, reducing the cross-sectional area of the frame 200 (e.g., due to the trapezoidal profiles) from adjacent the center toward the outer ends reduces the amount of structure and, thus, the weight of the frame 200. The back sheets of the frame do not need to be as high near the ends of the frame 200 since the crop only accumulates at it approaches the center of the header 112.

FIG. 4. is a front view of an embodiment of an outline of the frame 200 having a portion with a trapezoidal profile (e.g., extending from the centerline 203). The frame 200 of the header 112 may be modular or form a single component. As depicted, the frame 200 includes opposite mirror sides 244, 246 that meet at the centerline 203. The sides 244, 246 also define the inlet 201. The frame 200 includes a first longitudinal end 248 and a second longitudinal end 250 relative to the longitudinal axis 212 of the fame 200. The side 244 includes a longitudinal end 252 disposed at the centerline 203 and the longitudinal end 248 located distal from the centerline 203. The side 246 includes a longitudinal end 254 disposed at the centerline 203 and the longitudinal end 250 located distal from the centerline 203.

As depicted, both sides 244, 246 of the frame 200 include respective portions 256, 258 that include a trapezoidal shape or profile. The sides 244, 246 generally form mirror images of each other about the centerline 203. As depicted, the trapezoidal shape is located on a front side 220 of the frame 200 and extends towards a rear side (not shown) of the frame 200. In certain embodiments, the portion of the frame 200 including the trapezoidal profile may be located on a different part of the frame 200 (e.g., top side, bottom side, etc.). In certain embodiments, only one side 244, 246 of the frame 200 may include the portion 256, 258 having the trapezoidal profile.

The portion 256 includes bases 260, 262 and legs 264, 266. Base 260 is disposed, at end 252, at the centerline 203. The base 262 is disposed, at end 248, distal from the center line 203. At their respective axial locations (e.g., relative to the longitudinal axis 212), the bases 260, 262 extend traverse (e.g., orthogonal) to the longitudinal axis 212 and define the height 232 of the frame 200. As depicted, the height 232 of the frame 200 decreases from base 260 to base 262 (i.e., base 260 is longer than base 262). The legs 264, 266 run along the longitudinal axis 212 of the frame 200. As depicted, base 260 and leg 264 form an acute angle 234, while base 260 and leg 266 form an adjacent acute angle 236. Thus, as depicted, the trapezoidal profile of the portion 218 is an acute trapezoid. Base 262 and leg 264 form an obtuse angle 238 and base 262 and leg 266 form an adjacent obtuse angle 240. Due to the acute angles 234, 226, the legs 264, 266 are both angled toward the longitudinal axis 212 and the portion 256 (i.e., trapezoidal profile) tapers from base 260 toward base 262. As depicted, the legs 264, 266 have a same length 242. Thus, the trapezoidal profile of the portion 218 is also an isosceles trapezoid. In certain embodiments, the legs 264, 266 may have different lengths. In certain embodiments, the trapezoidal profile may be of a different trapezoid configuration. The portion 258 includes the bases 268, 270 and legs 272, 274. The description of the portion 258 is the same as the portion 256 except portion 258 is orientated in the opposite direction relative to the longitudinal axis 212. In certain embodiments, only one portion 256, 258 may include the trapezoidal profile.

FIG. 5 is a front view of an embodiment of an outline of the frame 200 having a portion with a trapezoidal profile (e.g., having a right trapezoid profile). The frame 200 is as described in FIG. 4 except each portion 256, 258 has a right trapezoid profile. In particular, angles 234, 236 are right angles. In addition, legs 264 and 266 have a different length 242 and, thus, the trapezoidal profile is not an isosceles trapezoid. Legs 272 and 274 also have a different length 242. In addition, angles 238 is an obtuse angle and angle 240 is an acute angle. Thus, bases 262, 270 are traverse to the longitudinal axis 212. In addition, bases 262, 270 is angled (but not orthogonal) relative to the longitudinal axis 212.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A header of an agricultural harvester, comprising:
a frame having a centerline defining a first side and a second side of the frame,
wherein:
a first portion of either the first side or the second side of the frame has a first trapezoidal profile comprising a first pair of legs that run along a longitudinal axis of the frame and a first pair of bases that form a height of the frame,
the first pair of legs comprise a first top leg and a first bottom leg, and
the first bottom leg is angled toward the longitudinal axis.

2. The header of claim 1, further comprising a draper.

3. The header of claim 1, wherein the first pair of bases comprise a first base and a second base, and the first base is disposed adjacent the centerline and the second base is distal from the centerline.

4. The header of claim 3, wherein the first base is disposed at the centerline.

5. The header of claim 3, wherein the first base is longer than the second base.

6. The header of claim 3, wherein the first side of the frame comprises the first portion having the first trapezoidal profile, and the second base is located on a longitudinal end of the frame.

7. The header of claim 3, wherein the second side of the frame comprises the first portion having the first trapezoidal profile, and the second base is located on a longitudinal end of the frame.

8. The header of claim 3, wherein the first top leg is angled toward the longitudinal axis, and the first top leg and the first bottom leg converge toward each other from the first base toward the second base.

9. The header of claim 1, wherein the first side comprises the first portion having the first trapezoidal profile, the frame comprises a second portion having a second trapezoidal profile comprising a second pair of legs that run along the longitudinal axis of the frame and a second pair of bases that form the height of the frame, the second pair of legs comprise a second top leg and a second bottom leg, and the second bottom leg is angled toward the longitudinal axis, and the second side comprises the second portion having the second trapezoidal profile.

10. The header of claim 1, wherein the frame comprises a center portion, a first segment, a second segment, the first and second segments are disposed on opposite sides of the center portion, the first side comprises the first segment, and the second side portion the second segment.

11. The header of claim 1, wherein the first trapezoidal profile extends from a back side to a front side of the first portion of the frame.

12. A header of an agricultural harvester, comprising:
- a frame having a centerline defining a first side and a second side of the frame,
- wherein:
  - a first portion of the first side of the frame has a first trapezoidal profile comprising a first pair of legs that run along a longitudinal axis of the frame and a first pair of bases that form a height of the frame,
  - the first pair of legs comprise a first top leg and a first bottom leg,
  - the first bottom leg is angled toward the longitudinal axis,
  - a second portion of the second side of the frame has a second trapezoidal profile comprising a second pair of legs that run along a longitudinal axis of the frame and a second pair of bases that form the height of the frame,
  - the second pair of legs comprise a second top leg and a second bottom leg, and
  - the second bottom leg is angled toward the longitudinal axis.

13. The header of claim 12, further comprising a draper.

14. The header of claim 12, wherein first trapezoidal profile and the second trapezoidal profile comprise mirror images relative to the centerline.

15. The header of claim 12, wherein the first pair of bases comprise a first base and a second base, the second pair of bases comprise a third base and a fourth base, the first and third bases are disposed adjacent the centerline and the second and third bases are distal from the centerline.

16. The header of claim 15, wherein the first and third bases are disposed at the centerline.

17. The header of claim 15, wherein the first and third bases are longer than the second and fourth bases.

18. The header of claim 15, wherein the second and fourth bases are located on opposite longitudinal ends of the frame.

19. The header of claim 12, wherein the first top leg is angled toward the longitudinal axis, and the first top leg and the first bottom leg converge toward each other from the first base toward the second base.

20. An agricultural harvester, comprising:
- a header, comprising:
  - a frame having a centerline defining a first side and a second side of the frame,
  - wherein:
    - a first portion of either the first side or the second side of the frame has a first trapezoidal profile comprising a first pair of legs that run along a longitudinal axis of the frame and a first pair of bases that form a height of the frame,
    - the first pair of legs comprise a first top leg and a first bottom leg, and
    - the first bottom leg is angled toward the longitudinal axis.

* * * * *